Sept. 25, 1928.

J. BAILEY 1,685,349

APPARATUS FOR AND PROCESS OF FINISHING BLOWN GLASS ARTICLES

Original Filed Nov. 26, 1923     7 Sheets-Sheet 1

INVENTOR
JAMES BAILEY.
BY
ATTORNEY

Sept. 25, 1928. 1,685,349
J. BAILEY
APPARATUS FOR AND PROCESS OF FINISHING BLOWN GLASS ARTICLES
Original Filed Nov. 26, 1923 7 Sheets-Sheet 4

INVENTOR
JAMES BAILEY.
BY
ATTORNEY

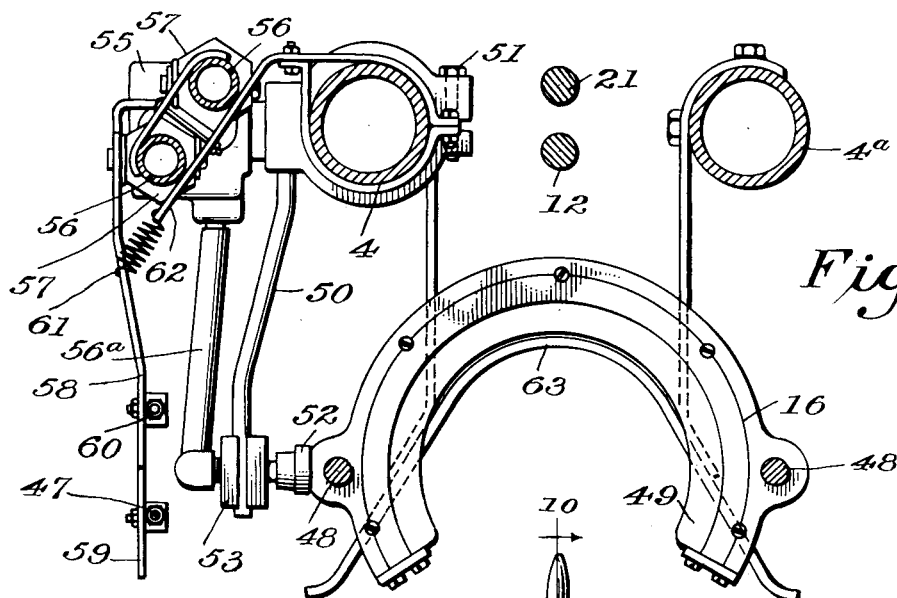
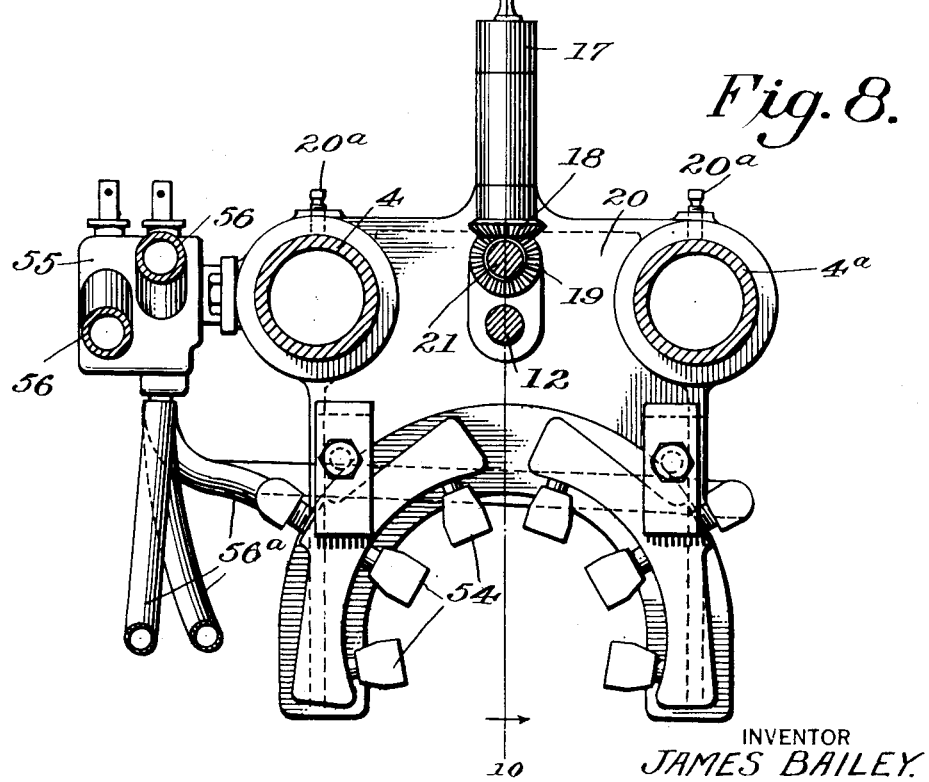

Sept. 25, 1928.  
J. BAILEY  
1,685,349  
APPARATUS FOR AND PROCESS OF FINISHING BLOWN GLASS ARTICLES  
Original Filed Nov. 26, 1923   7 Sheets-Sheet 6

INVENTOR
JAMES BAILEY.
BY
ATTORNEY

Patented Sept. 25, 1928.

1,685,349

UNITED STATES PATENT OFFICE.

JAMES BAILEY, OF CORNING, NEW YORK, ASSIGNOR TO CORNING GLASS WORKS, OF CORNING, NEW YORK, A CORPORATION OF NEW YORK.

APPARATUS FOR AND PROCESS OF FINISHING BLOWN-GLASS ARTICLES.

Application filed November 26, 1923, Serial No. 676,979. Renewed July 2, 1928.

Many articles of glass, especially those of the thinner type, such as electric lamp bulbs, are blown today by hand and by semi-automatic machines, as distinguished from the full automatic method wherein a finished article is produced by the machine alone. In both of the two first mentioned methods the partly finished blown article is at some stage of its manufacture attached to the end of a free blow-pipe. Blow-pipes with ware attached to them as indicated above are the ones used in carrying out this invention as it is the primary object of this invention to cut the article from the blow-pipe and to finally finish and anneal it.

The present invention has for its object to use the weight of the blow-pipe and the moil attached thereto to accelerate the severing of the glass articles from the blow-pipe. It has heretofore been suggested in blowing bulbs to make the moil, etc., unnecessarily large in order that weight may be provided below where the flame is to cut the article to form the finished product.

This invention, by reducing the time of severing the article from the blow-pipe, greatly reduces the heating medium used, and this, without in any way requiring a heavy moil or end.

A further object of the invention is to use the weight of the blow-pipe to draw out and thus thin the wall of the article, in the zone where severance is desired, while it is being finished in the machine. This is done by the weight of the blow-pipe pulling on the heated zone of the article attached to the blow-pipe while the article is supported in a chuck above the severing plane.

My invention also contemplates heat treating or annealing the article while it is being severed from the blowpipe, and thus I have invented a complete finishing machine for articles which are attached to the end of a below-pipe during fabrication.

In the accompanying drawings forming a part of this application:—

Fig. 7 is an enlarged section on line 7—7 of Fig. 1;

Fig. 8 is an enlarged section on line 8—8 of Fig. 1;

Figure 1:
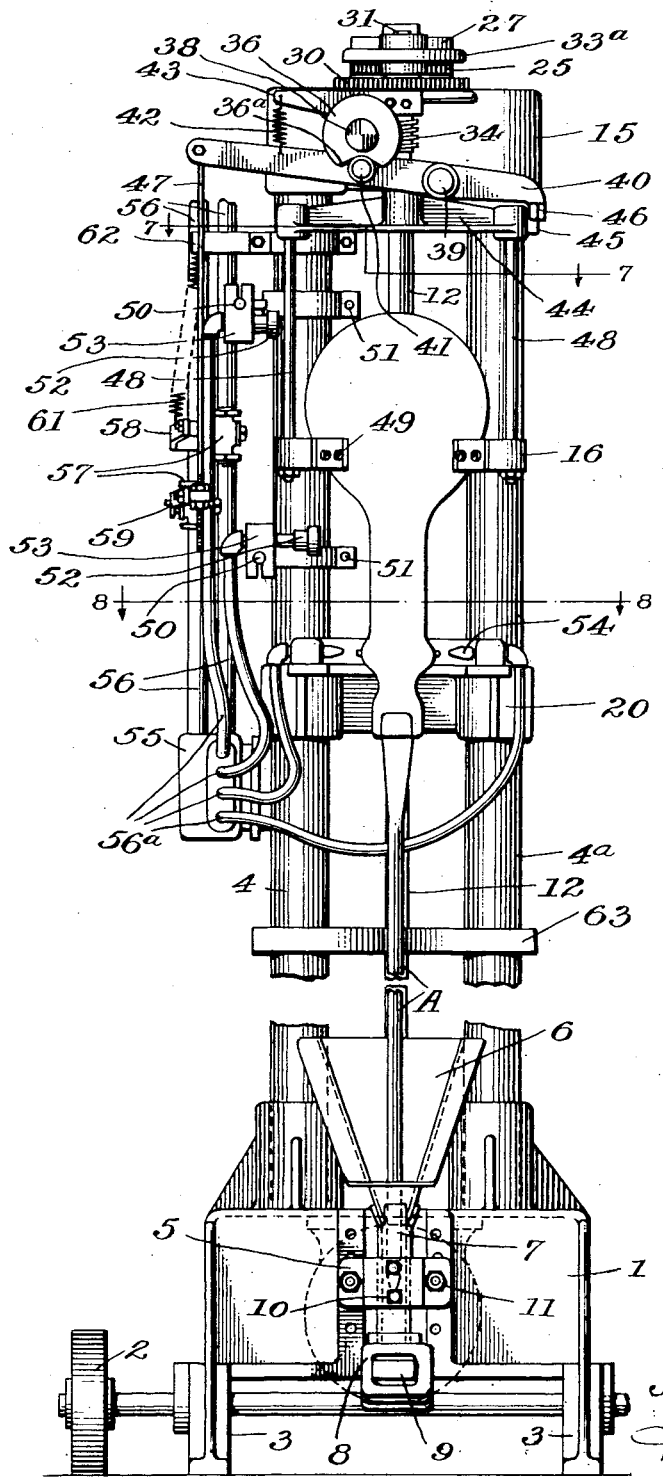
Figure 1 is a front elevation of a machine according to this invention with a part broken away.

In the drawings 1 have shown my invention applied to separating bulbs for electric lamps from the blow-pipes on which they are formed, by severing, by aid of heat and tension, the necks of the bulbs.

Figure 2:
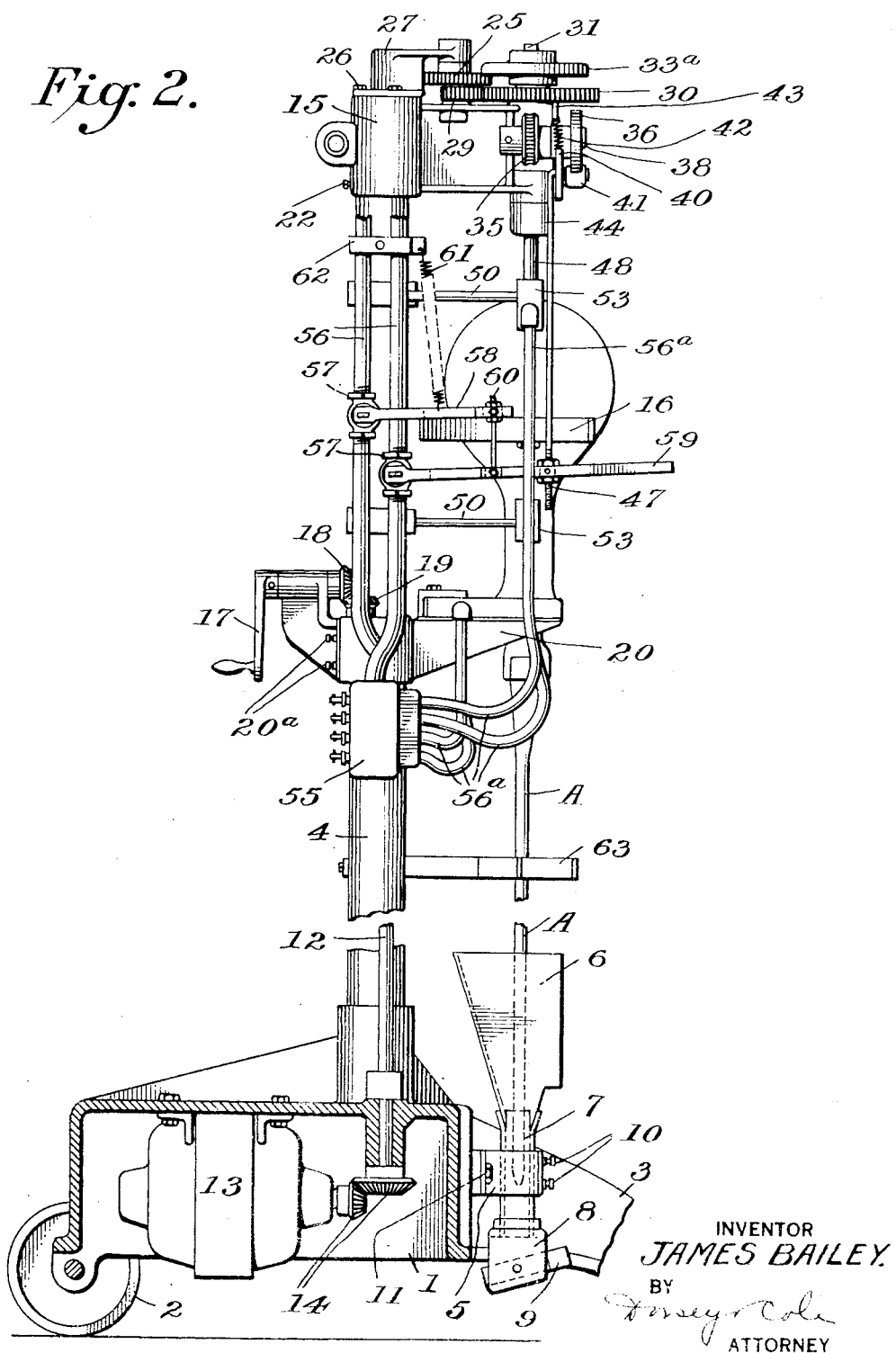
Fig. 2 is a side elevation of the machine shown in Fig. 1, with the base of the machine shown in section.
Figure 3:
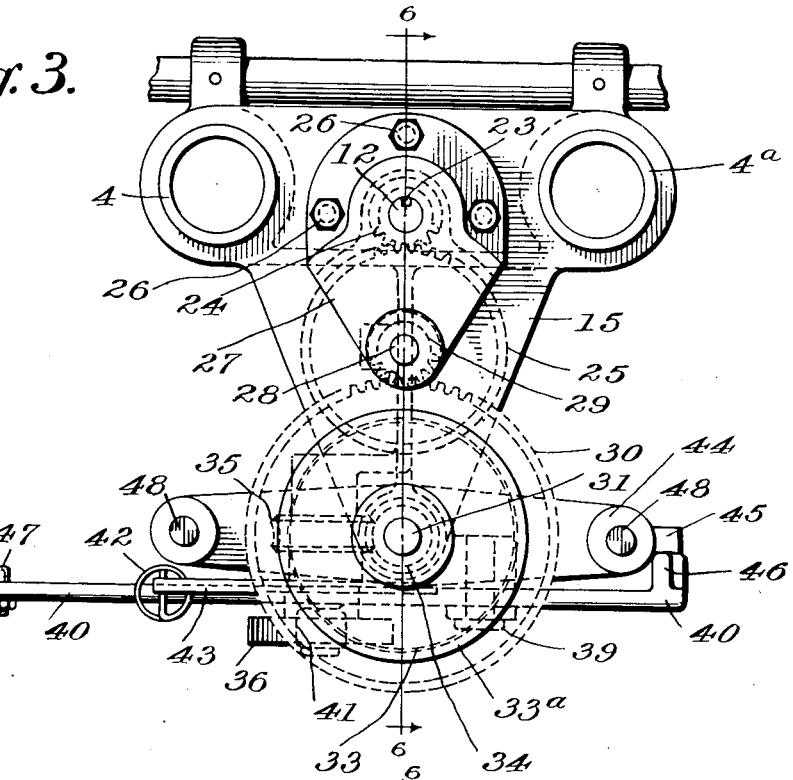
Fig. 3 is a plan view of the upper portion of the machine as shown in Fig. 1.

In the drawings (Figs. 1 and 2) 1 is the base of the machine supported at its rear by the wheels 2 and at its front by the feet 3. The base 1 carries the standards 4 and 4ª and the vertically adjustable bracket 5 to which is attached the funnel 6 adapted to guide the lower end of the blow-pipe A when the same is inserted in the machine. The funnel 6 is securely fixed on top of a pipe 7 which has at its lower end a saddle-shaped member 8, in which is an arresting block 9 made of some soft material, preferably wood, and held at such an angle that dust and dirt will not collect thereon. The purpose of this block 9 is to catch the blow-pipe when the latter drops after the necks of the bulbs have been cut by the burners. The pipe 7 and parts carried thereby are vertically adjustable by both the set screws 10 and the bolts 11 holding the bracket 5 to the base of the machine.

A motor 13 carried by the base of the machine constantly drives through beveled gears 14 the vertical shaft 12. The upper end of the shaft 12 is mounted on the head 15 adjustable vertically on the standards 4 and 4ª. The standards 4 and 4ª act as guides for the bracket 20, carrying the cutting burners 54, which are vertically adjustable on the uprights by the set screws 20ª.

Figure 6:
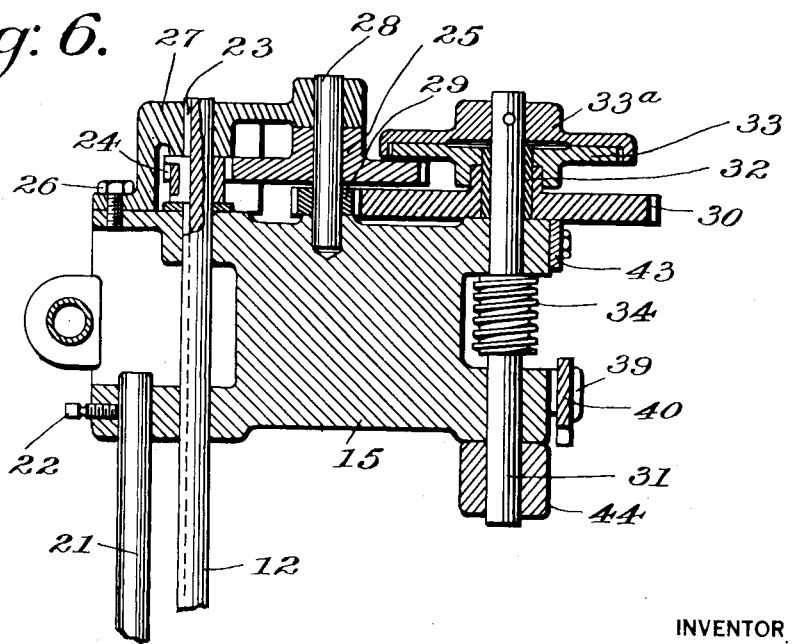
Fig. 6 is a vertical fore and aft section of the upper portion of the machine on line 6—6 of Figs. 3 and 4 and through the parts shown in Fig. 5.
Figure 9:
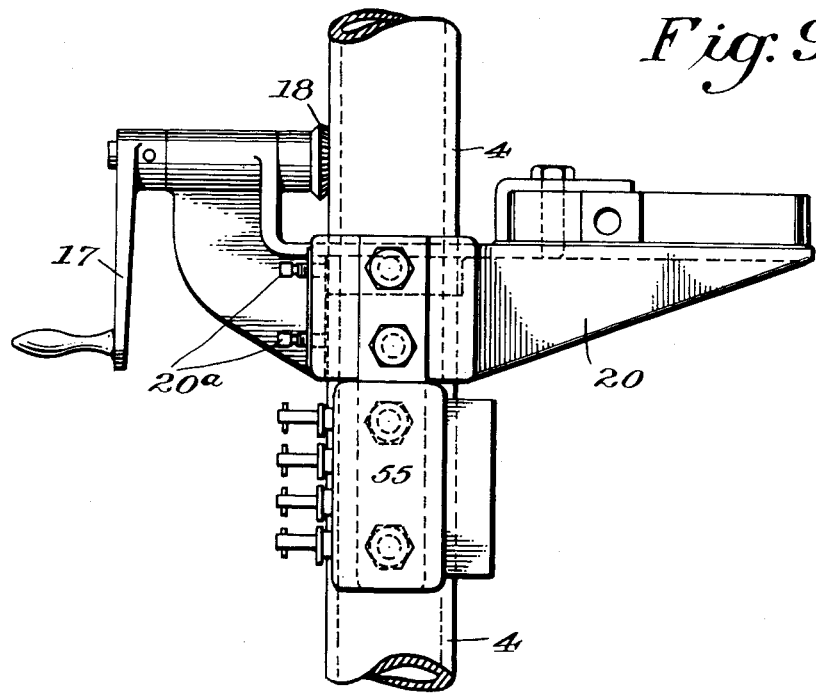
Fig. 9 is an enlarged side view of the central portion of the machine.
Figure 10:
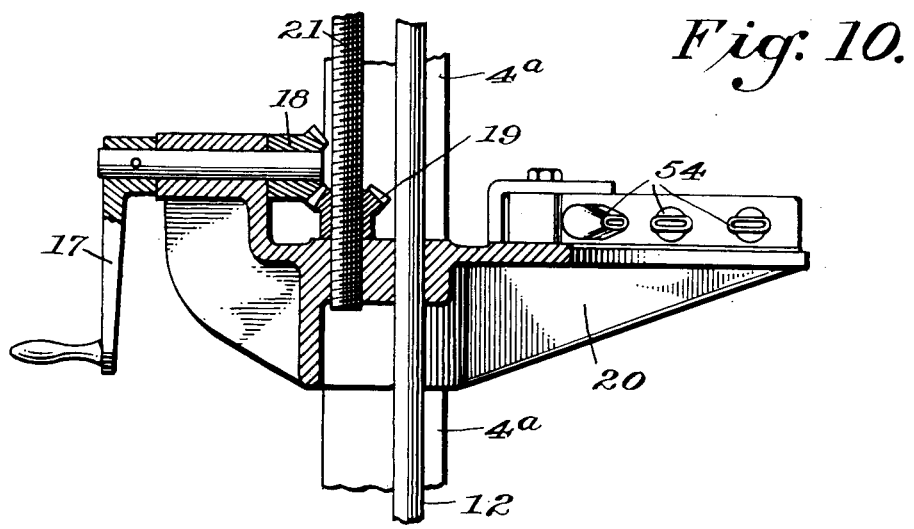
Fig. 10 is a vertical section on line 10—10 of Fig. 8, and through the parts shown in Fig. 9, and Figs. 11, 12 and 13 are partial front elevations of the machine showing burners playing on the glass article attached to the blow-pipe, and showing successive stages in severing an article.
Figures 11, 12:
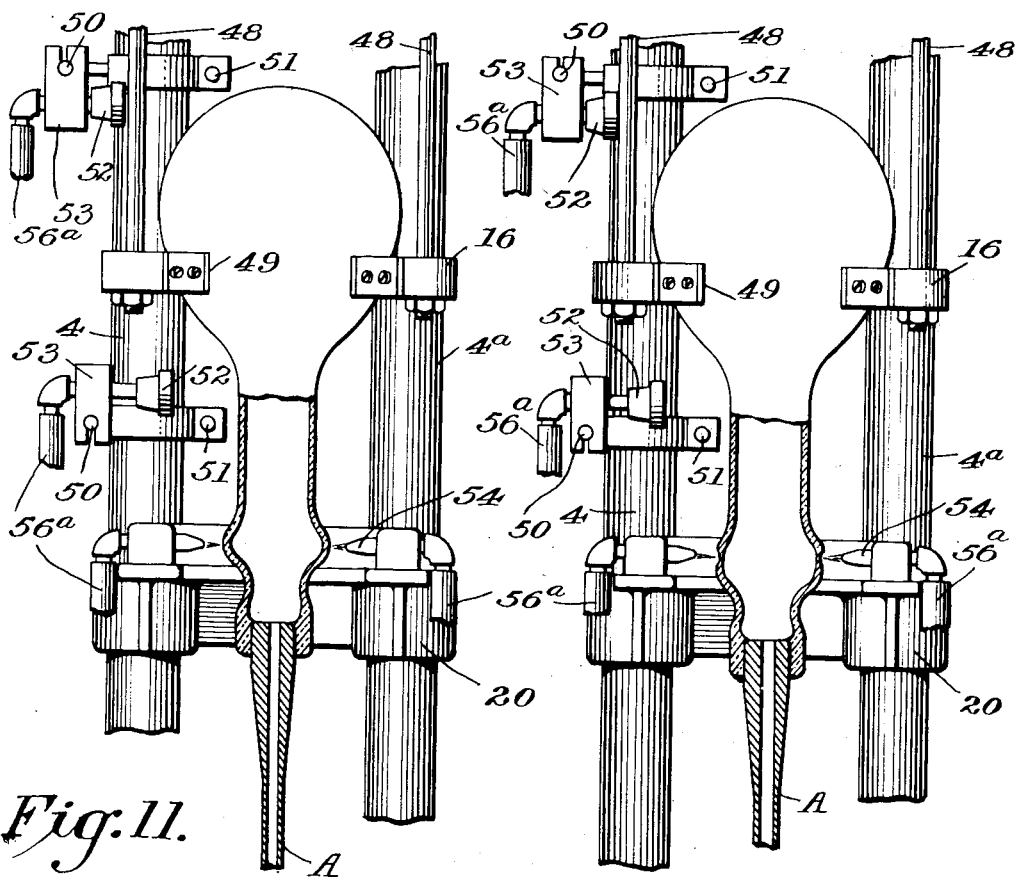
Figure 13:
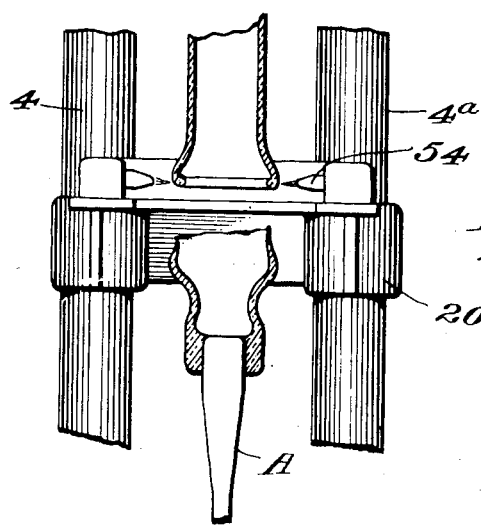

The head 15 is adjustable on the uprights by the mechanism shown in Figs. 6 and 10. By turning the crank 17, motion is imparted to the miter gears 18 and 19, the latter serving as a nut on the worm shaft 21, on which is fastened, by the set screw 22, the head 15.

The shaft 12 (Fig. 6), has a key-way 23 at its extreme upper end driving a gear 24. Bolts 26 holds the assembly plate 27 to the head 15. This plate 27 acts as an upper retainer for the slidable gear 24 and it also acts as an upper bearing for the vertical shaft 28 carrying the driven gear 25 (meshing with gear 24) and the driving gear 29. Gear 29 meshes with gear 30 locked on a sleeve 32 on a vertical shaft 31. On this sleeve 32 also is a friction disk 33. Fast on top of the vertical shaft 31 is the friction plate 33ª which, from the weight of the shaft and the assemblage thereon, has a tendency to press down on the constantly rotating friction disk 33, thus causing the shaft 31 to rotate except when the same is prevented from doing so, as will be later described. On the shaft 31 is a worm 34 which drives the worm wheel 35 (Fig. 5) and the locking wheel 36 having an indentation 36ª (Fig. 4), attached thereto by the sleeve 37. The worm gear 35, the wheel 36, and the spacing sleeve 37 are mounted to rotate on the stationary stud 38 carried on the head 15.

On the head 15 (Fig. 4) is a stud 39 on which is pivoted an arm 40, which has mounted on it the roller 41 held in contact with the locking wheel 36 by the spring 42, attached to the arm 43 projecting from the head 15. Shaft 31 terminates at its lower end in a yoke 44 on which is a lug or projection 45 adapted to engage the projection 46 on the end of the arm 40, to cause the shaft 31 to be held against rotation. When the arm 40 is moved by a pull on a rod 47 the projections 45 and 46 are disengaged and the roller 41 moved out of the indentation 36ª, and the yoke 44 is permitted to revolve. This downward movement of the arm 40 allows the locking wheel to start rotation so that the indentation moves away from over the roller 41, thus holding the arm 40 in a depressed position for a complete revolution of the wheel 36. This leaves the yoke 44 free to revolve until the indentation in the wheel again comes over the roller 41 permitting the latter to raise, thus causing the projections 45 and 46 to again engage and arrest the rotation of the yoke 44 with the chuck in a definitely fixed position. It is apparent, therefore, that with the proper designing of parts, the yoke 44 and the chuck 16 carried thereby can be made to revolve any desired number of times before the yoke 44 will be arrested by the engaging of the projections 45 and 46, and that when so arrested the yoke will be definitely located.

The mechanism arresting the rotation of the yoke 44 and the chuck 16 carried thereby operates so that the opening in the chuck 16 is always positioned in front, whereby easy loading and unloading of the machine can be accomplished.

Suspended directly beneath and from the yoke 44 (see Figs. 1 and 7) by the rods 48, is the chuck 16 in the form of an open collar made of iron lined with some heat insulating material 49, so that the glass article to be finished will not come into direct contact with the iron and thus become cracked or scratched. The inner diameter of the chuck should be of the proper size and contour to fit the article which it is to hold, being shown as of less diameter than the belly of the bulb which rests thereon.

The standard 4 carries the annealing burner arms 50 (Figs. 1 and 7) which clamp around the upright and can be adjusted vertically by the cap screws 51. The annealing burners 52 are mounted on burner blocks 53 adjustable on the burner arms 50. While only two annealing burners are shown, any desired number can be arranged on the uprights 4 and 4ª, so that the article will be properly annealed.

Below the annealing burners and below the chuck is the bracket 20 (Figs. 1 and 8), adjustable vertically on the standards by the set screws 20ª, and carrying the cut-off burners 54 arranged partially around the axis of the chuck with an opening in front, and which are of such character that a flame is produced sufficient for the action hereafter described. Bolted to this bracket 20 is a distributing block 55 for the gas and air furnished by the pipes 56 and then distributed to the annealing burners 52 and the cut-off burners 54 by pipes 56ª. In the pipes 56 are the valves 57 (Fig. 2) controlling the feed of air and gas to the block 55, and actuated by the operating lever 59 and the arm 58 connected by the adjustable rod 60 so that when desired, as when the machine is operating, a strong flame will play on the article, but when the article has been finished, the flame will subside to only a pilot flame. These valves 57, controlling the air and gas, are normally held closed, except for a pilot flame, by the spring 61 attached to the bracket 62 clamped on the gas and air pipes. Attached near the outer end of the lever 59 (see Fig. 2) and connected with the arm 40 is the adjustable rod 47.

The operating lever 59 thus completely controls the operation of the clutch mechanism and of the several sets of burners 52, 54. Intermediate of the base of the machine and the level of the chuck a guard rail 63 is carried by the standards.

*Operation.*

Figure 4:
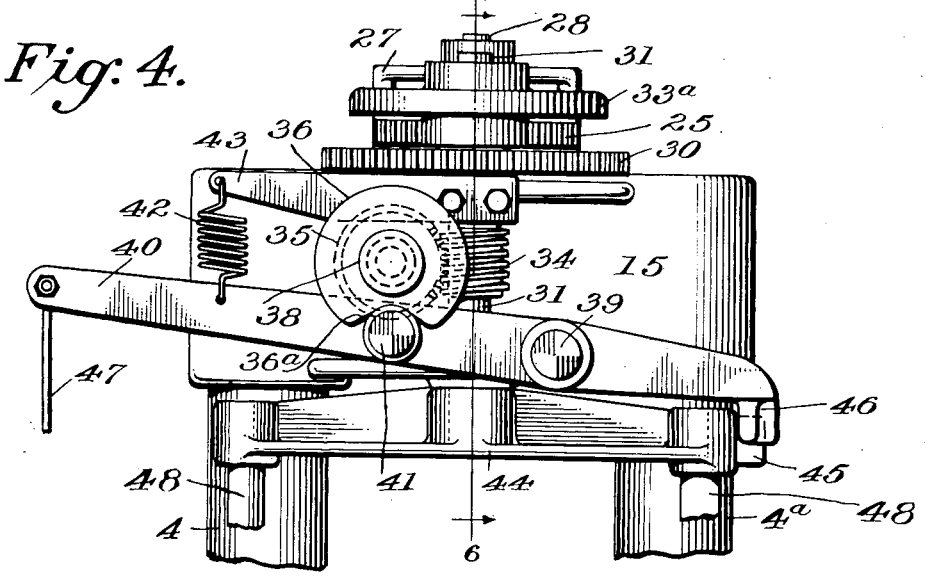
Fig. 4 is a front elevation of the upper portion of the machine as shown in Fig. 1.
Figure 5:
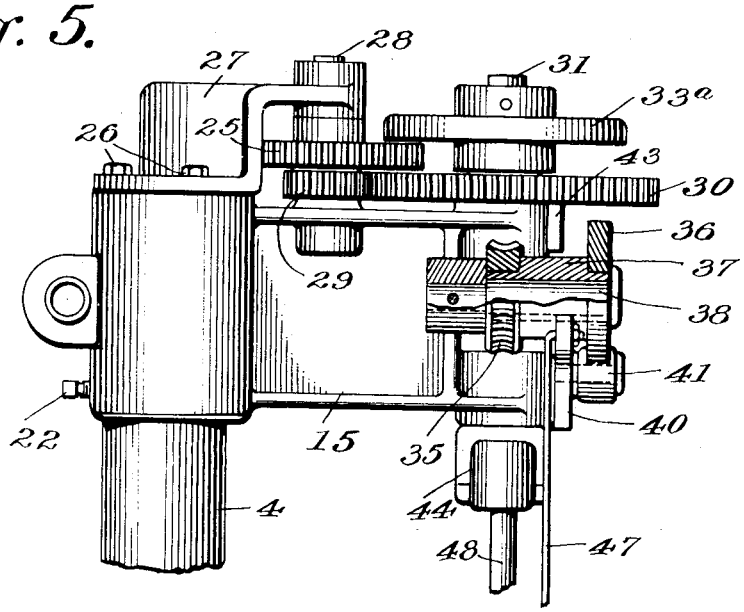
Fig. 5 is a side elevation partly in section of the upper portion of the machine as shown in Fig. 2.

The operator places a bulb carried on a blow-iron in the chuck, which has been arrested in a position so that the opening is towards him. The bulb is supported by the chuck with the blow-pipe A, pendant vertically. In inserting the blow-pipe into the machine, the operator is assisted by the guide trough 6. The operator then pulls down on the operating lever 59, which causes the annealing and cut off burners, which have heretofore been pilot lights only, to be fed more gas and air. This motion of the operating lever 59 also pulls down the control rod 47, disengaging the projections 45 and 46, so that the sliding clutch can revolve the yoke 44 and chuck 16 holding the bulb with the blow-pipe attached. When the arm 40 is lowered by the pull on the operating lever, the wheel 36 revolves and holds the arm 40 depressed for one complete revolution of the wheel 36. During the entire time the arm 40 is down the chuck 16 is revolved, and likewise the several sets of burners are open full, playing intense flame on the article to be finished. When the wheel 36 has completed a revolution, the roller 41 seats, as shown in Fig. 4, thus allowing the projection 46 on arm 40 to engage the projection 45 on the yoke 44 carrying the chuck mechanism, and causing the chuck to cease revolving. The seating of the roller also causes the rod 47 attached to the arm 40 to close the valves 57 so that only a pilot flame is left.

During the rotation of the chuck the bulb is revolving in a path of flame caused by the annealing burners 52 and cut-off burners 54. The latter intensely heat a narrow zone around the neck of the bulb above the point of attachment of the blow-pipe, and this heating, in conjunction with the pull exerted on the heated zone by the weight of the heavy blow-pipe, has the effect of separating the neck of the bulb quickly. The suspended blow-pipe also tends to elongate the heated portion of the neck of the bulb and thereby thin the same.

After severance has taken place the cut-off burners fire-polish the ragged edge of the bulb forming this into a well rounded bead.

It has been shown that the control lever 59 controls the entire operation of the machine, and that pressure exerted on this lever causes the machine to function automatically thereafter. When the chuck 16 has been arrested, the operator can remove the cut-off bulb, as well as the blow-pipe, with the moil attached thereto, which has fallen on the arresting block 9. The blow-pipe may, however, be removed at any time after severance, which is preferably during the first part of the cycle.

This being done, the operation can be repeated.

The length of the cycle may be determined either by the time required for annealing or heat treating the bulb, or by the time necessary to sever it and fire-polish the bead.

Having thus described my invention what I claim as new and desire to secure by Letters Patent is:—

1. In a finishing machine, the combination of regulable heating burners, a driving shaft, an intermittently revoluble open sided chuck, a sliding friction clutch interposed between said shaft and chuck, with co-acting manually controlled means for releasing the chuck for revolution by said clutch, and simultaneously increasing the intensity of the heating burners, and automatic means for arresting the chuck in a predetermined position and decreasing the intensity of the burners.

2. In a finishing machine, the combination of regulable heating burners, a driving shaft carrying a member of a sliding friction clutch, an open sided chuck adapted to be intermittently revolved and fixed to the other part of said sliding friction clutch, and manually controlled co-acting means for increasing the intensity of said heating burners and for releasing the chuck to permit its revolution, and automatic means for arresting the chuck in a predetermined position, and decreasing the intensity of the heating burners.

3. A finishing machine for glass articles comprising a driving shaft, an open-sided chuck, a friction clutch for rotating the chuck, regulable burners manually controlled, co-acting means for controlling the clutch to rotate the chuck, and for increasing the intensity of the burners, and automatic means for arresting the chuck so that the opening therein is next to the operator, and at the same time diminishing the intensity of the burners.

4. A finishing machine comprising means for supporting the article to be finished with the implement on which it was made suspended therefrom, and means for simultaneously annealing the article and separating it from the implement.

5. A finishing machine comprising means for supporting the article to be finished with the implement on which it was made suspended therefrom, means for separating the article from the implement and means for catching the implement after the separation.

6. The method of increasing the speed of severing a glass article from the implement on which it was made, which consists in suspending the implement by the article and subjecting the latter to heat.

7. The method of cutting off a glass article from an implement on which it was made, which consists in supporting the article in a zone of cutting heat until the article with the implement suspended thereform separates above the point of attachment of the implement.

8. The method of cutting off a glass article from an implement on which it was made, which consists in vertically revolving the article with the implement suspended therefrom in a zone of cutting heat until the article separates above the point of attachment of the implement.

9. The method of cutting off a glass article from an implement on which it was made which consists in supporting and revolving the article around a vertical axis in a heated zone until its walls are thinned and severed by the conjoint action of the heat and the weight of the implement.

10. The method of finishing glass articles, which consists in subjecting the article to be finished to heat while holding it in a revolving chuck with the implement on which it was made suspended from the article, so that the weight of the implement will thin the walls of the article to be finished, and also accelerate the cutting action due to the heat.

11. The method of finishing bulbs, which consists in subjecting the bulb to be finished to heat while it is held in a revolving chuck with the implement on which it was made suspended from the bulb, and applying cutting heat to the neck of the bulb, whereby the neck is thinned and severed by the conjoint action of the heat and the weight of the implement.

12. The method of simultaneously annealing an article and separating it from the implement on which it was made, which consists in revolving the article in heated zones with the implement supported by the article.

13. The method of cutting and finishing a glass bulb which consists in revolving the bulb in heated zones, with the implement on which it was made supported from the bulb so that the bulb is annealed and completely severed from the implement.

In testimony whereof I hereunto affix my signature.

JAMES BAILEY.